Aug. 3, 1954  L. SEITZ  2,685,282
ENGINE CASING FOR INTERNAL-COMBUSTION ENGINES
Filed Aug. 23, 1951

INVENTOR
LUDWIG SEITZ
BY Marechal & Biebel
ATTORNEYS

Patented Aug. 3, 1954

2,685,282

UNITED STATES PATENT OFFICE 2,685,282

ENGINE CASING FOR INTERNAL-COMBUSTION ENGINES

Ludwig Seitz, Augsburg, Germany, assignor to Maschinenfabrik Augsburg-Nürnberg A. G., Augsburg, Germany, a corporation of Germany Application August 23, 1951, Serial No. 243,318

Claims priority, application Germany October 21, 1950

6 Claims. (Cl. 123—195)

This invention relates to an engine casing for multi-cylinder internal combustion engines, more particularly, Diesel engines, whose constructional elements are joined substantially by welding.

Engine casings welded together from steel plates, steel castings or forgings and specially shaped profiled parts can be made considerably lighter in weight than cast casings. However, in many instances their torsional resistance is not sufficient, so that after a longer period of operation of the internal combustion engine local overstressing of the welding seams will occur. This is particularly true in Diesel engines with their inherent high combustion pressures.

It is an object of the present invention to provide a welded construction which is designed so that the danger of premature destruction of the casing is avoided.

Another object of the invention is to provide an engine casing combining minimum weight with a maximum torsional resistance.

With these and further objects in view, according to the present invention the walls of the casing extending in a spaced relationship to the cylinders consist of corrugated plates which are more or less adapted to the contours of the cylinders to be accommodated in a common casing. The walls are designed so as to form simultaneously the external walls of the cooling water chambers surrounding the cylinders. These corrugated casing walls are joined by welding to the driving gear casing and to the mounting plates extending from end to end of the row of cylinders. An engine casing designed in this way has an increased torsional resistance which can be further improved by welding supporting plates in the trough or concave parts of the waves of the casing walls projecting towards the joint between two adjacent cylinders. Passed through the hollow spaces thus resulting are tie rods which serve to direct the high operating pressures of the internal combustion engine from the cylinder covers directly into the driving gear casing and with the aid of which simultaneously the longitudinal welded seams of the walls of the casing are pre-loaded by pressure.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 1:
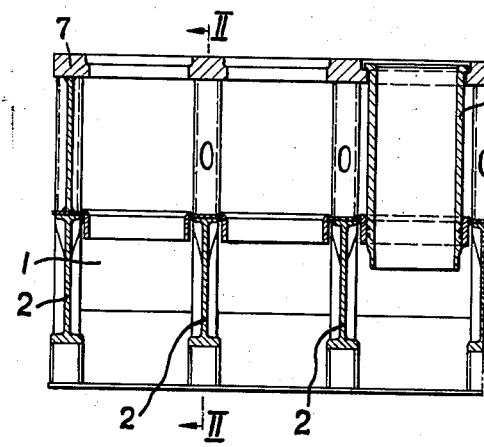
Fig. 1 is a longitudinal section on line I—I of Fig. 2 through an engine casing having the invention applied thereto.
Figure 2:
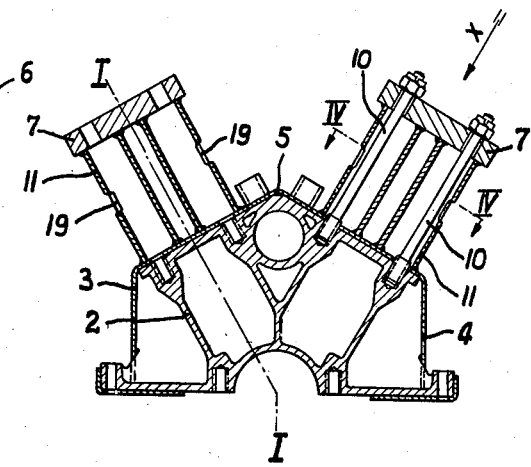
Fig. 2 is a cross section on line II—II of Fig. 1.
Figure 3:
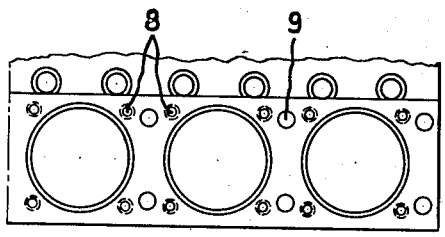
Fig. 3 is a plan view in the direction of the arrow $x$ in Fig. 2.
Figure 4:
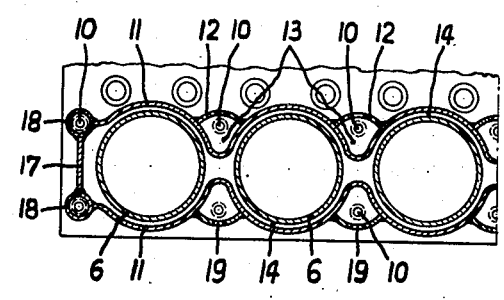
Fig. 4 is a horizontal longitudinal section on line IV—IV of Fig. 2.

Referring now to the drawings in greater detail, it will be seen that the engine base includes a driving gear casing 1 having partition walls 2 for reception of the crank shaft and cam shaft bearings. Said walls 2 are made of cast steel or drop-forged and are held together by welded-in side plates 3, 4 and a cover plate 5. Mounted on this driving gear casing 1 are two rows of cylinders, in the form of a V-type engine. The cylinder sleeves 6 of each row of cylinders are inserted in a top cylinder head plate 7 extending from end to end of the respective row, said plate 7 comprising threaded holes 8 for the cylinder cover screws (not shown) and bores 9 for free passage of tie rods 10 by which the working pressures of the engine are directly transmitted from the cylinder covers into the partition walls 2 of the driving gear casing. Each of the longitudinal walls 11 consists of a plate bent in the form of waves and extending over the whole length of the row of cylinders. The side walls 11 are also connected by welding to the driving gear casing 1 and the top plates 7. Bent supporting plates 12 are welded in the wave troughs of the side walls 11 which are directed towards the connecting points of adjacent cylinders, said supporting plates together with the side walls 11 of the casing forming hollow spaces 13 through which the tie rods 10 are passed. By means of the tie rods 10 the side walls 11 and their longitudinal welded seams can be pre-loaded by pressure. The supporting plates 12 have one or more openings 19 through which the chips produced in making the passages and bores for the tie rods can be removed. Simultaneously the side plates 11 of the casing form the outer walls of the cooling water chambers 14 around the cylinders 6. Their ends are closed by end walls 17 welded to barrels 18 for tie rods 10. Said barrels 18 in turn are welded to the side walls 11, and both the end walls 17 and the barrels 18 are also connected by welding to the driving gear casing 1 and to the top plate 7.

Figure 5:
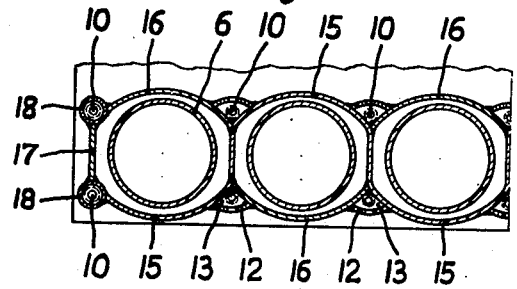
Fig. 5 is a horizontal section through a row of cylinders, in which the corrugated casing walls are designed in a different way.

Fig. 5 shows a modified form of the corrugated side walls of the casing. In this case the cylinders 6 are arranged in the troughs of the waves of a single plate 15 which is bent serpentine-fashion around each of the cylinders 6. The open sides of the troughs are closed by curved plates 16 connected to plate 15 by welding. Here again short curved plates 12 are welded in at the joints between adjacent cylinders 6 for forming hollow spaces 13 for tie rods 10. Again, end walls 17 and barrels 18 for tie rods 10 are also provided so as to form a closed casing.

The novel construction of the engine casing according to the present invention is extremely stiff against torsion and yet light in weight.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In an engine casing for Diesel engines having a plurality of cylinders arranged in a row, the combination which comprises elongated curved side walls partially enclosing said cylinders and extending therealong in spaced relation thereto, extension portions integral with said walls extending at least partially between adjacent cylinders, and load-bearing supporting plates on the outside of said walls defining with said extension portions closed passages parallel to said cylinders.

2. In a welded engine casing for Diesel engines having a plurality of cylinders arranged in a row upon an engine base and tie rods for connecting a cylinder head plate to said base, the combination which comprises curved side walls extending between said base and said plate in spaced relation along said cylinders, curved extension portions integral with said walls projecting inwardly at least partially between adjacent cylinders, and curved supporting plates on the outside of said walls between adjacent cylinders defining with said extension portions closed passages parallel to the axes of said cylinders for receiving and enclosing said tie rods.

3. In a welded engine casing for a Diesel engine having a plurality of cylinders arranged in a row upon an engine base and a cylinder head plate for receiving outer ends of said cylinders, the combination which comprises a curving unitary side wall for said row of cylinders extending from said base to said plate in spaced relation to said cylinders, said wall conforming substantially to the corrugated contour of said row of cylinders and being welded to said base and said plate, curved extension portions on said wall projecting inwardly at least partially between adjacent cylinders, a plurality of tie rods interconnecting said plate and said base, and curved supporting plates on the outside of said wall between adjacent cylinders defining with said extension portions passages between adjacent cylinders for receiving and enclosing said tie rods.

4. In a welded engine casing for a Diesel engine having a plurality of cylinders arranged in a row upon an engine base and a cylinder head plate for receiving outer ends of said cylinders, the combination which comprises a curving unitary side wall for said row of cylinders extending from said base to said plate in spaced relation to said cylinders, said wall conforming substantially to the corrugated contour of said row of cylinders and being welded to said base and said plate, curved extension portions on said wall projecting inwardly at least partially between adjacent cylinders, a plurality of tie rods interconnecting said plate and said base, curved supporting plates on the outside of said wall between adjacent cylinders defining with said extension portions passages between adjacent cylinders for receiving and enclosing said tie rods, and means for pre-loading said wall and supporting plates and said welded joints thereof to insulate said joints from combustion pressure forces within said cylinder.

5. In a welded engine casing for a Diesel engine having a plurality of cylinders arranged in a row upon an engine base and a cylinder head plate for receiving outer ends of said cylinders, the combination which comprises a curving unitary side wall for said row of cylinders extending from said base to said plate in spaced relation to said cylinders, said wall conforming substantially to the corrugated contour of said row of cylinders and being welded to said base and said plate, curved extension portions on said wall projecting inwardly at least partially between adjacent cylinders, a plurality of tie rods interconnecting said plate and said base, and curved supporting plates welded on the outside of said wall between adjacent cylinders defining with said extension portions passages between adjacent cylinders for receiving and enclosing said tie rods, the length and tension of said tie rod pre-loading said wall and welded joints therein for relieving said joints from maximum combustion pressure forces within said cylinder.

6. In a welded engine casing for Diesel engines having a plurality of cylinders arranged in a row upon an engine base and tie rods for connecting a cylinder head plate to said base, the combination which comprises a serpentine side wall member intertwined among said cylinders and enclosing alternate sides of adjacent cylinders, said member extending from said base to said plate and being welded thereto, additional curved wall members welded to said serpentine member enclosing sides of said cylinders opposite to sides enclosed by said serpentine member, and curved supporting plates welded to said wall members between adjacent cylinders defining with said wall members passages parallel to the axes of said cylinders for receiving and enclosing said tie rods.

References Cited in the file of this patent

UNITED STATES PATENTS

| Number | Name | Date |
|---|---|---|
| 1,287,359 | Leipert | Dec. 10, 1918 |
| 1,382,420 | Fuller | June 21, 1921 |
| 1,511,672 | Kirkham | Oct. 14, 1924 |
| 2,030,995 | Loeffler | Feb. 18, 1936 |
| 2,436,729 | Paxman | Feb. 24, 1948 |
| 2,504,973 | Gehres | Apr. 25, 1950 |

FOREIGN PATENTS

| Number | Country | Date |
|---|---|---|
| 175,115 | Switzerland | May 1, 1935 |
| 593,942 | Great Britain | Oct. 29, 1947 |